June 27, 1950 G. MacMARTIN 2,512,952
COMBINED SCRAPER AND STEEL WOOL HOLDER
Filed Sept. 17, 1945

INVENTOR
Georgiana MacMartin
BY
Fred C. Matheny
ATTORNEY

Patented June 27, 1950

2,512,952

UNITED STATES PATENT OFFICE 2,512,952

COMBINED SCRAPER AND STEEL WOOL HOLDER

Georgiana MacMartin, Seattle, Wash.

Application September 17, 1945, Serial No. 616,810

1 Claim. (Cl. 15—105)

This invention relates to a combined scraper and steel wool holder and an object of this invention is to provide a strong, simple, durable, inexpensive, practical and efficient scraper and steel wool holder that is particularly well adapted for kitchen use in cleaning pots, pans, skillets and other kitchen utensils.

Another object is to provide a combined scraper and steel wool holder that will save time and labor in the cleaning of kitchen utensils and one that will make it possible to clean kitchen utensils more efficiently and to keep them in a cleaner and more sanitary condition.

Another object of this invention is to provide a device of this nature that will protect the hands of the user from undesirable contact with the utensils being cleaned and from undesirable contact with the steel wool that is being used.

Another object is to provide a device of this nature that will simultaneously scrape and scour or clean.

Another object of this invention is to provide a combined scraper and steel wool holder comprising a tubular handle portion having a slot extending from end to end thereof and having flanges extending in opposite directions from said slot, the edges of said flanges being varied in shape and serving as scrapers, said handle and slot being adapted to receive a pad of steel wool or like material and said flanges serving as supports for said pad and as hand guards to protect the hands of the user from contact with the pad and from contact with objects that are being cleaned.

Other objects of the invention will be apparent from the following description taken in connection with the accompanying drawings.

In the drawings.

Like reference numerals designate like parts throughout the several views.

Figure 1:
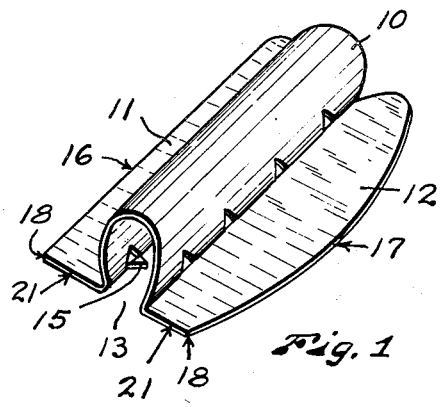
Figure 1 is a perspective view showing the outer or top side of this device.
Figure 2:
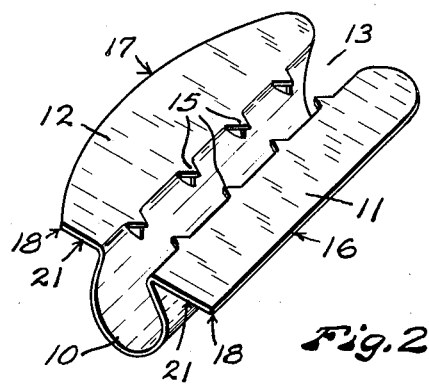
Fig. 2 is a perspective view showing the bottom side of the same.
Figure 3:
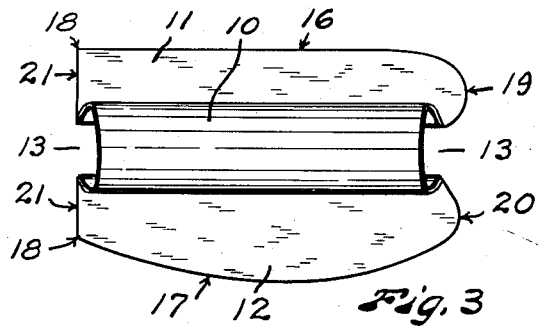
Fig. 3 is a top plan view of the device.
Figure 4:
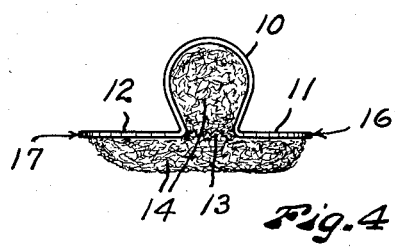
Fig. 4 is an end elevation of the device showing a pad of material, such as steel wool, operatively held therein.

This combined scraper and steel wool holder comprises a hollow tubular handle portion 10 having two outwardly extending base flanges 11 and 12. The handle 10 is preferably of generally rounded or oval cross sectional shape and has a relatively wide slot 13 left between the outwardly extending flanges 10 and 11 whereby a pad 14 of material such as steel wool may be inserted and held therein. Obviously the pad 14 can carry or be impregnated with soap, polishing material and the like.

Preferably a plurality of inwardly protruding prongs 15 are provided at the locations where the flanges 11 and 12 and handle 10 are joined together. The inner ends of these prongs 15 are sharp enough to readily penetrate the pad 14 but are not sharp enough so that they will injure the hands in inserting or removing the pads 12. These prongs 15 help to hold the pad 14 immovable in the holder. However I find that a steel wool pad can be practically and successfully held in a holder in which these prongs 15 are omitted.

The holder is preferably made of non-corrosive material, such as sheet metal, which may be correctly formed by stamping and bending, or plastic, which may be formed by molding. The material used is hard enough for scraping purposes but soft enough so that it will not damage utensils on which it is used.

The handle 10 is open at both ends to facilitate insertion and removal of pads 14 and to render the device more sanitary and more easily cleaned. In cleaning the device hot water may be poured through the handle from end to end to wash, clean and sterilize the pad 14 therein.

The pads 14 can be quickly and easily formed by hand out of steel wool or they can be preformed if desired. The portion of the pad in the handle 10 tends to expand and fill this handle and this pad is somewhat compressed where it passes through the slot 13 so that this pad will be held firmly in the holder even in the absence of the prongs 15. Protruding portions of the pad 14 are supported by the flanges 11 and 12 in the proper manner to adapt them for scouring or cleaning use.

Figure 5:
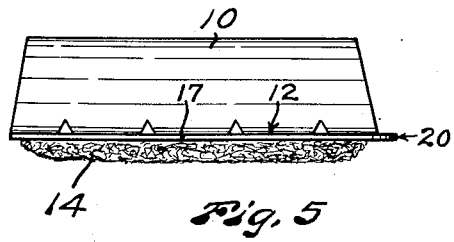
Fig. 5 is a side elevation of the device with the pad therein.

To better adapt the flanges 11 and 12 for scraping utensils of various shape and contour I preferably provide one flange 11 with a straight lateral edge 16 and the other flange 12 with a convexly curved lateral edge 17. Also the flanges 11 and 12 may have straight scraping edges 21 and non-rounded corners 18 at one end while at the other end these flanges may be convexly rounded to provide two scraping edges 19 and 20 of different shape and curvature. Preferably the end portions of the handle 10 are not perpendicular to the flanges 11 and 12, but are inclined as best shown in Fig. 5, to facilitate application of the ends 21, 18, 19 and 20 of the flanges 11 and 12 to surfaces to be scraped.

In the kitchen this device may be used for substantially any scraping, scouring or polishing work for which scrapers, steel wool, or the like are ordinarily used. Also it may be used for many other purposes where scrapers, steel wool, pumice, sandpaper, and the like are used, such as the cleaning and conditioning of floors. Obviously the device may be made in different sizes to meet different requirements.

Obviously changes in the device herein disclosed may be made within the scope and spirit of the following claim.

I claim:

A device of the class described comprising a hollow tubular handle portion of relatively rigid non-flexible material open at both ends and having a slot of substantial width but of less width than the handle portion extending from end to end thereof along the base of said handle portion, the ends of said handle portion being inclined convergently from the base outwardly; and two flange members of relatively rigid non-flexible material disposed in a common plane and extending outwardly in opposite directions from the base of said handle portion at the sides of the slot therein and forming hand guards and supports for the pad, the end portions of said flange members extending beyond the inclined ends of said handle portion and the ends of said flange members being shaped to provide straight and curved edges and relatively sharp corners usable as scrapers, the convergent incline of the ends of said handle portion facilitating application of the end portions of said flanges to surfaces being scraped.

GEORGIANA MacMARTIN.

REFERENCES CITED

The following references are of record in the file of this patent:

UNITED STATES PATENTS

| Number | Name | Date |
|---|---|---|
| 1,211,098 | Darrin | Jan. 2, 1917 |
| 1,711,572 | Marvin | May 7, 1929 |
| 1,895,496 | Stephens | Jan. 31, 1933 |
| 1,958,408 | Jelliffe et al. | May 15, 1934 |
| 2,037,944 | Steinhardt | Apr. 21, 1936 |
| 2,207,286 | Cohen | July 9, 1940 |